United States Patent
McDonough et al.

(10) Patent No.: US 9,300,663 B2
(45) Date of Patent: *Mar. 29, 2016

(54) COMMUNICATION SESSION TRANSFER BETWEEN DEVICES

(71) Applicant: FMR LLC, Boston, MA (US)

(72) Inventors: John C. McDonough, Nahant, MA (US); Hadley Rupert Stern, West Newton, MA (US)

(73) Assignee: FMR LLC, Boston, MA (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/467,627

(22) Filed: Aug. 25, 2014

(65) Prior Publication Data
US 2015/0020185 A1    Jan. 15, 2015

Related U.S. Application Data

(63) Continuation of application No. 13/480,191, filed on May 24, 2012, now Pat. No. 8,850,037.

(51) Int. Cl.
*G06F 15/16*    (2006.01)
*H04L 29/06*    (2006.01)
*H04L 29/08*    (2006.01)

(52) U.S. Cl.
CPC .......... *H04L 63/0853* (2013.01); *H04L 63/061* (2013.01); *H04L 63/08* (2013.01); *H04L 63/1475* (2013.01); *H04L 63/168* (2013.01); *H04L 67/02* (2013.01); *H04L 67/148* (2013.01)

(58) Field of Classification Search
CPC .............. H04L 63/0853; H04L 63/061; H04L 63/1475; H04L 67/02; H04L 67/148; H04L 63/08; H04L 63/168; H04L 29/06; H04L 29/08
USPC .......................................... 709/220, 227, 228
See application file for complete search history.

(56) References Cited

U.S. PATENT DOCUMENTS 7,143,195 B2    11/2006    Vange et al.
7,487,248 B2    2/2009    Moran et al.

(Continued)

OTHER PUBLICATIONS

HØjgaard-Hansen, K. et al., Abstract for "Session mobility solution for client-based application migration scenarios," IEEE Xplore, Wireless On-Demand Network Systems and Services (WONS), Jan. 2011, 1 pg.

(Continued)

*Primary Examiner* — Cheikh Ndiaye
(74) *Attorney, Agent, or Firm* — Proskauer Rose LLP (57) ABSTRACT

Methods and apparatuses, including computer program products, are described for communication session transfer between a plurality of computing devices. A first computing device detects a presence of a second computing device in proximity to the first device, where the first device has established a first communication session with a remote computing device. The first device establishes a wireless connection to the second device. A first token is transmitted to the second device. A second token is received from the second device. The second token is authenticated via comparison to the first token. The first device transmits, to the second device, information indicating a state of the first communication session to enable the second device to establish a second communication session with the remote device, where the second communication session is established using the state of the first communication session.

27 Claims, 4 Drawing Sheets

(56) References Cited

U.S. PATENT DOCUMENTS

| | | | |
|---|---|---|---|
| 7,676,583 B2 | 3/2010 | Eaton et al. | |
| 7,809,842 B2 | 10/2010 | Moran et al. | |
| 8,181,226 B2 | 5/2012 | Lohr | |
| 2001/0052075 A1* | 12/2001 | Feinberg | 713/168 |
| 2007/0234048 A1* | 10/2007 | Ziv | 713/159 |
| 2007/0282990 A1 | 12/2007 | Kumar et al. | |
| 2009/0005341 A1 | 1/2009 | Oreste et al. | |
| 2009/0055341 A1* | 2/2009 | Bidkar et al. | 706/47 |
| 2009/0060201 A1* | 3/2009 | Rhodes et al. | 380/279 |
| 2011/0196973 A1* | 8/2011 | Shaheen et al. | 709/228 |
| 2013/0185558 A1 | 7/2013 | Seibert et al. | |

OTHER PUBLICATIONS

Song, H. et al., "Browser Session Preservation and Migration," DoCoMo Communications Labs, 2 pgs.

Non-final Office Action from U.S. Appl. No. 13/480,191 dated Nov. 7, 2013, 16 pages.

Notice of Allowance from U.S. Appl. No. 13/480,191 dated Aug. 12, 2014, 7 pages.

International Search Report and Written Opinion from PCT application No. PCT/US13/38859, dated Jul. 30, 2013, 15 pages.

* cited by examiner

FIG. 4

COMMUNICATION SESSION TRANSFER BETWEEN DEVICES

RELATED APPLICATIONS

This application is a continuation of U.S. patent application Ser. No. 13/480,191, filed on May 24, 2012, which is incorporated herein by reference.

FIELD OF THE INVENTION

The subject matter of this application relates generally to methods and apparatuses, including computer program products, for communication session transfer between a plurality of computing devices.

BACKGROUND OF THE INVENTION

Mobile devices such as smart phones, laptops, tablets, and the like have steadily increased in processing power and communication capability, allowing the devices to provide functionality that has previously been limited to desktop computing systems with dedicated network access. For example, mobile devices are able to connect to remove servers wirelessly and establish a communication session according to a protocol (e.g., Hypertext Transfer Protocol (HTTP), Transmission Control Protocol (TCP), and/or Bluetooth) for access to websites and other service offerings.

The security of such wireless communication sessions is increasingly important, in view of the potentially sensitive information that can be transmitted during a session. For example, a person may wish to check his bank account balance or apply for a mortgage loan using his smart phone. Eavesdroppers who listen in on the wireless signal must be prevented from gaining access to the sensitive information. The mobile devices have the capability of establishing and managing a communication session in a secure manner, through use of encryption and authentication techniques, such as HTTP Secure (HTTPS), Secure Socket Layer (SSL), public-key infrastructure (PKI), digital certificates, and secure cookies.

Also, many people now own a plurality of mobile devices and other personal computing devices and regularly use the devices for the same or similar purposes. For example, a person may carry a smart phone for web access (e.g., shopping, financial transactions, email, and/or job tasks) while commuting to and from work, and the person may switch to a tablet or laptop computer when she arrives home to continue the same activities. For example, if the person is reviewing her investment portfolio on her mobile device through an HTTPS session with Fidelity, she may want to pick up where she left off using a laptop in her home office. However, the person must manually establish another session with Fidelity on the laptop by connecting to the website, providing authentication credentials, and navigating to the same page or section of the website that she had been accessing on her mobile device.

SUMMARY OF THE INVENTION

What is needed is a wireless transfer of a communication session between devices to provide the user with a seamless transition from the transferring device to the recipient device. The techniques described herein provide for automatic transfer of active communication sessions from one device to another, while providing security and privacy mechanisms to protect the session transfer from unauthorized access and to ensure that the session is only transferred between validated devices.

The invention, in one aspect, features a method for communication session transfer between a plurality of computing devices. A first computing device detects a presence of a second computing device in proximity to the first computing device, where the first computing device has established a first communication session with a remote computing device. The first computing device establishes a wireless connection to the second computing device. A first token is transmitted to the second computing device, where the first token includes a shared key and an identifier associated with the first computing device and the first token is configured to render the first token invalid if copied for use as an identifier for another device. A second token is received from the second computing device, where the second token includes a shared key and an identifier associated with the second computing device and the first token is configured to render the second token invalid if copied for use as an identifier for another device. The second token is authenticated via comparison to the first token. The first computing device transmits, to the second computing device, information indicating a state of the first communication session to enable the second computing device to establish a second communication session with the remote computing device, where the second communication session is established using the state of the first communication session.

The invention, in another aspect, features a system for communication session transfer between a plurality of computing devices. The system comprises a first computing device, a second computing device, and a remote computing device. The first computing device is configured to detect a presence of a second computing device in proximity to the first computing device, where the first computing device has established a first communication session with the remote computing device, and establish a wireless connection to the second computing device. The first computing device is further configured to transmit a first token to the second computing device, where the first token includes a shared key and an identifier associated with the first computing device and the first token is configured to render the first token invalid if copied for use as an identifier for another device. The first computing device is further configured to receive a second token from the second computing device, where the second token includes a shared key and an identifier associated with the second computing device and the second token is configured to render the second token invalid if copied for use as an identifier for another device. The first computing device is further configured to authenticate the second token via comparison to the first token, and transmit information to the second computing device indicating a state of the first communication session to enable the second computing device to establish a second communication session with the remote computing device, where the second communication session is established using the state of the first communication session.

The invention, in another aspect, features a computer program product, tangibly embodied in a non-transitory computer-readable storage medium, for communication session transfer between a plurality of computing devices. The computer program product includes instructions operable to cause a first computing device to detect a presence of a second computing device in proximity to the first computing device, where the first computing device has established a first communication session with a remote computing device, and establish a wireless connection to the second computing device. The computer program product includes instructions operable to further cause the first computing device to transmit a first token to the second computing device, where the first token includes a shared key and an identifier associated with the first computing device and the first token is configured to render the first token invalid if copied for use as an identifier for another device. The computer program product includes instructions operable to further cause the first computing device to receive a second token from the second computing device, where the second token includes a shared key and an identifier associated with the second computing device and the second token is configured to render the second token invalid if copied for use as an identifier for another device. The computer program product includes instructions operable to further cause the first computing device to authenticate the second token via comparison to the first token, and transmit information to the second computing device indicating a state of the first communication session to enable the second computing device to establish a second communication session with the remote computing device, where the second communication session is established using the state of the first communication session.

Any of the above aspects can include one or more of the following features. In some embodiments, the first communication session is at least one of: an HTTP-based session, an HTTPS-based session, or a TCP-based session. In some embodiments, detecting the presence of a second computing device includes monitoring an area around the first computing device for the presence of the second computing device. In some embodiments, the first token is generated by a security module of the first computing device, and the second token is generated by a security module of the second computing device.

In some embodiments, the first computing device determines whether the identifier of the second computing device is on a trusted list stored at the first computing device, establishes the wireless connection if the identifier of the second computing device is on the trusted list, and refuses the wireless connection if the identifier of the second computing device is not on the trusted list. In some embodiments, the first computing device determines whether the second computing device is connected to a same local network as the first computing device, establishes the wireless connection if the second computing device is connected to the same local network, and refuses the wireless connection if the second computing device is not connected to the same local network.

In some embodiments, the wireless connection includes at least one of: a Bluetooth connection, a near-field communication (NFC) connection, or a Wi-Fi connection. In some embodiments, the first computing device transmits, to the second computing device, a request to terminate the first communication session, and the second computing device terminates the first communication session. In some embodiments, terminating the first communication session includes destroying a cookie associated with the first communication session, transmitting a session termination request to the remote computing device, or both. In some embodiments, the first computing device transmits, to the remote computing device, a request to terminate the first communication session. In some embodiments, establishing a second communication session with the remote computing device includes launching, by the first computing device, an application to establish the second communication session. In some embodiments, the launched application includes a web browsing application. In some embodiments, the second communication session is established with one or more same security settings as the first communication session.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
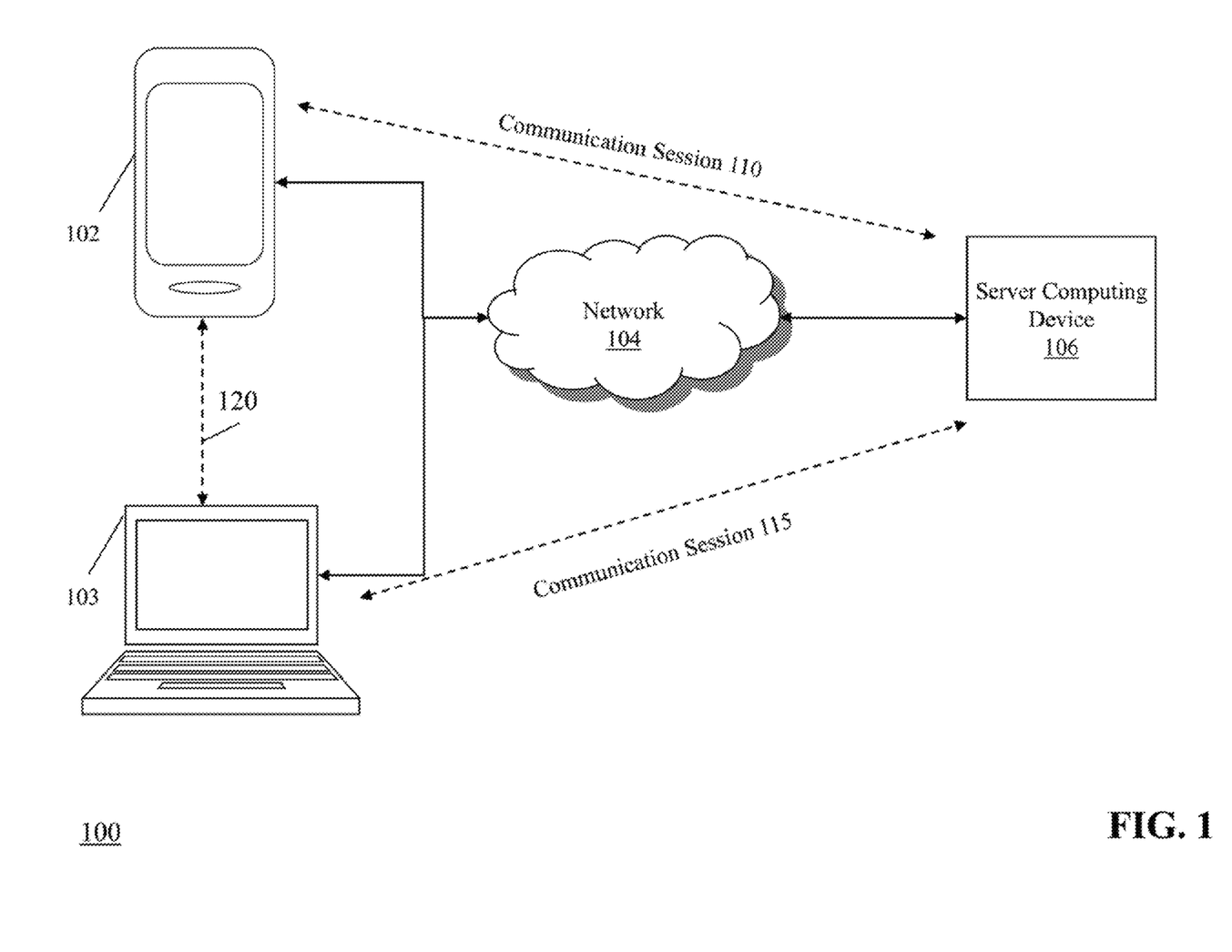
FIG. 1 is a block diagram of a system for communication session transfer between a plurality of computing devices.

FIG. 1 is a block diagram of a system 100 for communication session transfer between a plurality of computing devices (e.g., computing devices 102, 103). The system 100 includes a mobile computing device 102, a desktop computing device 103, a communications network 104, and a server computing device 106. The mobile computing device 102 can establish a communication session 110 with the server computing device 106 via the network 104. The mobile computing device 102 can communicate with the desktop computing device 103 via a wireless connection 120 (e.g., Wi-Fi, Bluetooth, and/or near-field communication (NFC)). Although FIG. 1 depicts only a single mobile computing device 102, a single desktop computing device 103, a single communications network 104, and a single server computing device 106, the techniques described herein are not limited to this structure. Instead, this system 100 can include any of a number of configurations or components (e.g., multiple mobile and/or desktop computing devices, multiple servers) that do not depart from the scope and spirit of the invention.

In addition, it should be appreciated that the system 100 is not required to include a mobile computing device 102 and a desktop computing device 103. Other computing devices can be introduced in place of the mobile computing device 102 and desktop computing device 103. For example, the desktop computing device 103 can be replaced with a tablet computing device (e.g., iPad from Apple Computer Corp., Android™-based tablet, and/or other similar devices) without departing from the spirit and scope of the invention.

As mentioned above, the mobile computing device 102 communicates with the server computing device 106 via the communications network 104 to establish a communication session 110. Example mobile computing devices 102 can include, but are not limited to, a smart phone (e.g., Apple iPhone®, BlackBerry®, and/or Android™-based device) or other mobile communications device, a tablet computer, an internet appliance, a personal computer, or the like. In some examples, the mobile device 102 can be installed in a vehicle. The mobile device 102 includes network-interface components to enable the device to connect to a communications network 104, such as the Internet, wireless network (e.g., GPRS, CDMA, and/or RF), or the like. The mobile device 102 also includes components to enable the device to connect to other devices (e.g., desktop device 103) via a short-range frequency connection 120 (e.g., Bluetooth, Wi-Fi, and/or NFC).

The desktop computing device 103 also communicates with the server computing device 106 via the communications network 104. The desktop device 103 can also establish a communication session 115 with the server device 106. The desktop device 103 includes network-interface components (e.g., modem, Ethernet card, and/or wireless adapter) to enable the device to connect to a communications network 104, such as the Internet. The desktop device 103 also includes components to enable the device to connect to other devices (e.g., mobile device 102) via a short-range frequency connection 120 (e.g., Bluetooth, Wi-Fi, and/or NFC). In some embodiments, the mobile device 102 and the desktop device 103 are located on the same local network. For example, the devices 102, 103 can be located at a user's residence and connect to a broadband cable modem for shared network access.

The server computing device 106 communicates with the mobile device 102 and the desktop device 103 via the network 104. In some embodiments, the server computing device 106 is a web server that is capable of establishing a communication session 110, 115 with the mobile device 102 and/or the desktop device 103—such as receiving HTTP/HTTPS requests from remote devices (e.g., devices 102, 103) and responding with HyperText Markup Language (HTML) content for presentation on the respective remote devices. For example, a user of the mobile device 102 can enter the Uniform Resource Locator (URL) of a website associated with his investment account, such as http://www.fidelity.com. The mobile device 102 transmits a request to the server computing device 106 via the network 104 (e.g., Internet), and the server device 106 responds with data for presentation of the home page of fidelity.com on the mobile device 102.

The communications network 104 channels communications from the mobile device 102 and/or the desktop device 103 to the server 106. The network 104 may be a local network, such as a LAN, or a wide area network, such as the Internet or the World Wide Web. The network 104 may utilize cellular, satellite or other wireless communications technology. For example, the mobile device 102 may send and receive information via a communications link to a satellite, which in turn communicates with the server 106. The mobile device 102 and the server 106 can transmit data using standard formatting and/or transmission protocols, such as XML, HTTP, HTTPS, TCP, SMS, JSON, or other similar data communication techniques.

As described above, a user of the mobile device 102 can use the browser software installed on the mobile device 102 to connect to the server device 106 and establish a communication session 110 with the server. For example, the user may wish to review the asset allocation in his personal investment account held at Fidelity Investments. The user can enter the URL (http://www.fidelity.com) and establish a communication session 110 between the mobile device 102 and the server computing device 106 (e.g., web server operated by Fidelity). In some embodiments, the user is required to enter login credentials (e.g., username and/or password) or meet other authentication criteria before he can access his account information.

While the user is reviewing his asset allocation using Fidelity's website, he may want to switch from using the mobile device 102 to using another computing device (e.g., desktop device 103) without having to manually initiate another session with the website on the desktop device 103. For example, the user may have already logged in to his account on the website and prepared an ad-hoc report detailing his present asset allocation. As a result, the user may not want to log in again and prepare the same report on his desktop device 103. Instead, the user may want to transfer the current page and state of the existing session with Fidelity's website seamlessly to the desktop device 103.

Figure 2:
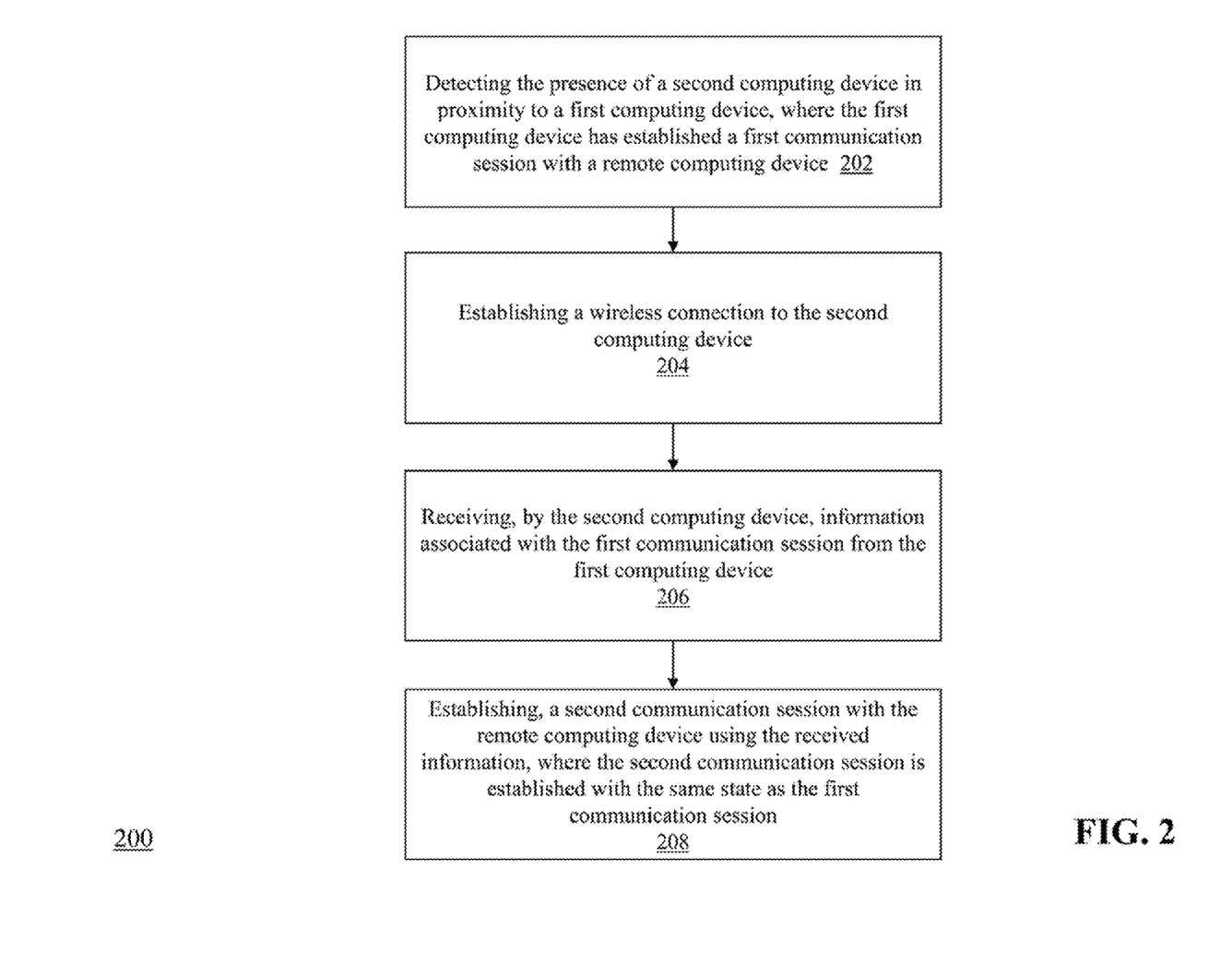
FIG. 2 is a flow diagram of a method for communication session transfer between a plurality of computing devices.

FIG. 2 is a flow diagram of a method 200 for communication session transfer between a plurality of computing devices using the system 100 of FIG. 1. The first computing device (e.g., mobile device 102) detects (202) the presence of a second computing device (e.g., desktop device 103) in proximity to the mobile device 102 that has established a first communication session with a remote computing device (e.g., server device 106). Continuing with the above example, the mobile device 102 can be configured to monitor an area around the device 102 to determine the existence of any other devices with which the mobile device 102 can communicate. The user can pass the mobile device 102 close to the desktop device 103 (e.g., waving the mobile device in front of the desktop device). Using its monitoring capabilities and associated network interface and antenna components, the mobile device 102, in conjunction with the device software, determines that the desktop device 103 is in proximity to the mobile device based on a signal emitted by the desktop device 103. In some embodiments, the desktop device 102 detects the existence of the mobile device 102 using similar techniques.

Once the mobile device 102 has detected the existence of the desktop device 103, the mobile device 102 establishes (204) a wireless connection 120 to the desktop device 103. In some embodiments, the mobile device 102 can use wireless communication protocols, such as Bluetooth or NFC, to establish the connection 120. In another embodiment, the mobile device 102 can use a shared network (e.g., Wi-Fi) to establish the connection 120.

After the mobile device 102 has established the wireless connection to the desktop device 103, the desktop device 103 receives (206) information associated with the communication session 110 from the mobile device 102. The information can include files stored on the mobile device 102 that indicate the state of the user's interaction with the website, such as HTTP or HTTPS cookies. The information can also include data items related to the communication session 110, such as the URL and/or other address information (e.g., IP address of the server 106). In some embodiments, the information includes a token (or a portion of a token) generated by the mobile device 102 and used by the desktop device 103 to authenticate the identity of the mobile device 102. More detail about creation and exchange of the token is described below with respect to FIG. 3.

When the desktop device 103 has received the information from the mobile device 102, the desktop device 102 establishes (208) a second communication session 115 with the server computing device 106 using the received information. The second communication session 115 is established with the same state as the first communication session 110. For example, as mentioned above, the desktop device 103 can automatically open a web browser and establish a communication session 115 with the server device 106 using the received information. The desktop device 103 can also automatically navigate to the same location (e.g., URL) as previously presented on the mobile device 102, and can automatically provide authentication credentials to the server device 106 using the received information. Upon establishing the second communication session 115, the desktop device 103 displays the same content as had been delivered from the server device 106 and presented on the mobile device 102, appearing to the user as a seamless transfer of the session to the new device.

As described above, after establishing a connection with the mobile device 102, the desktop device 103 receives information associated with the communication session 110 from the mobile device 102. An important consideration in this process is the security and privacy of the connection between the devices 102 and 103, as well as the identity of the devices 102 and 103. A user may desire that his communication sessions can only be transferred between devices under his control, and not to other devices that may be in proximity to his transferring device. For example, thieves or hackers may use their own devices in an attempt to intercept a communication session transfer from a user's mobile device 102.

Figure 3:
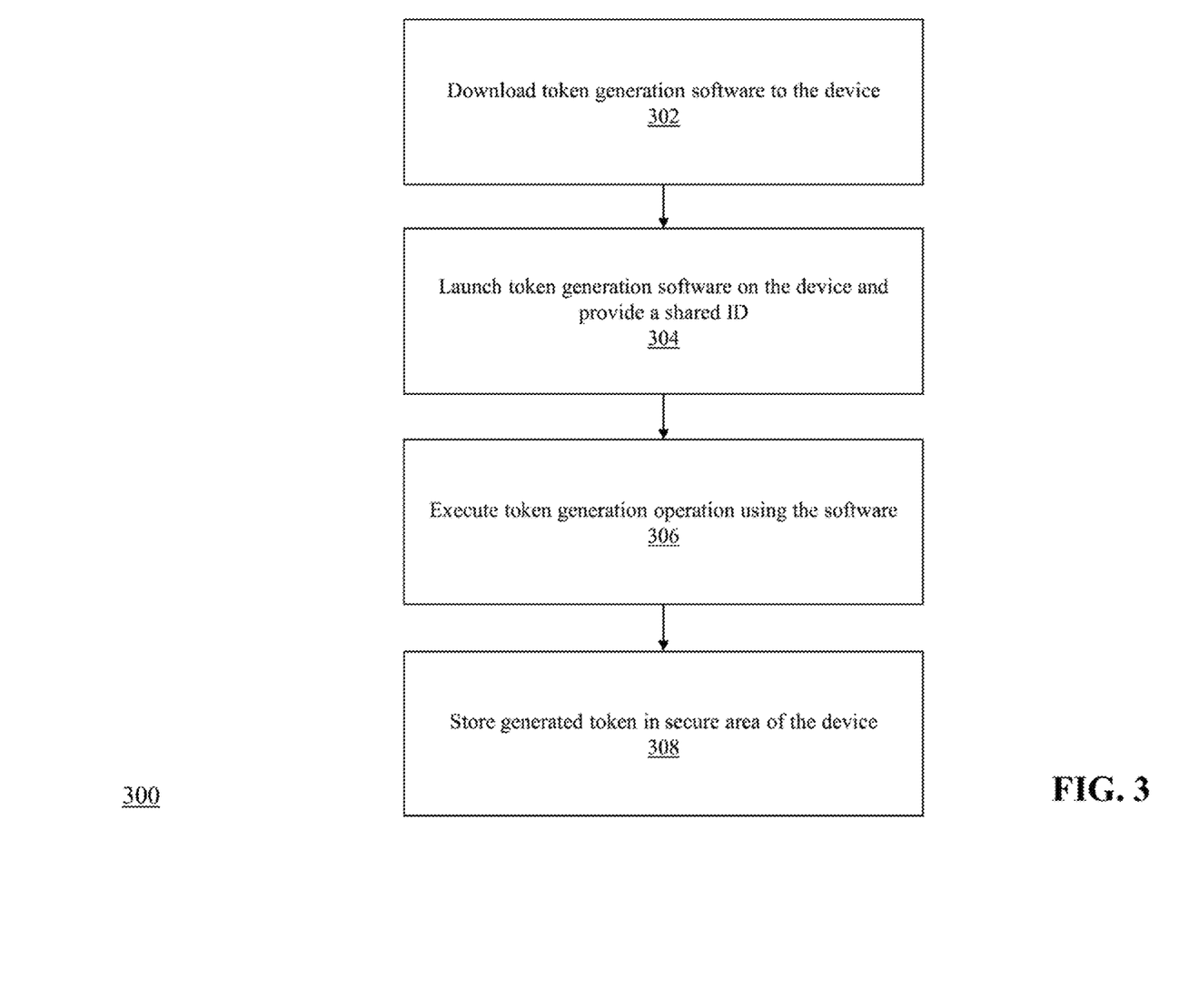
FIG. 3 is a flow diagram of a method for creating a secure token for communication session transfer between a plurality of computing devices.

To provide the desired security and privacy, the devices 102 and 103 can generate tokens, or portions of tokens, to be exchanged and validated during subsequent establishment of the wireless connection 120. FIG. 3 is a flow diagram of a method 300 for creating a secure token for communication session transfer between a plurality of computing devices, using the system 100 of FIG. 1. Token generation and management software is downloaded (302) to mobile device 102 and the desktop device 103. The software can be a proprietary application and/or module that is installed on the respective device. In some embodiments, the software is related to the particular server device 106 and/or website for which the user wishes to transfer a communication session.

The software is launched (304) on each device 102 and 103, and the user provides a shared ID that is common to all of the devices. For example, the shared ID can be a pass code or other text string that is known only to the user. Use of the shared ID provides a way for the respective devices 102 and 103 to identify each other as valid devices with which a connection can be established and a communication session can be transferred.

The device executes (306) the token generation operation in the software to create the token. The software includes the shared ID in the token structure. The software also incorporates an identifier in the token structure that uniquely identifies the individual device, such as a device ID (e.g., MAC address). The software also includes other parameters in the token structure such as the duration that the token is active, and preferred or required connection protocols to be used when wirelessly connecting to other devices (e.g., NFC, Bluetooth, and/or Wi-Fi). In some embodiments, the token is encrypted to protect the information in the token and increase the level of security associated with the token.

The software stores (308) the generated tokens in a secure area of the respective devices 102 and 103. Because the token contains the unique identifier of the device on which the token is stored, the token is not valid if relocated to another device—preventing unauthorized copying or use of the token to gain access to a communication session being transferred between devices 102 and 103.

Figure 4:
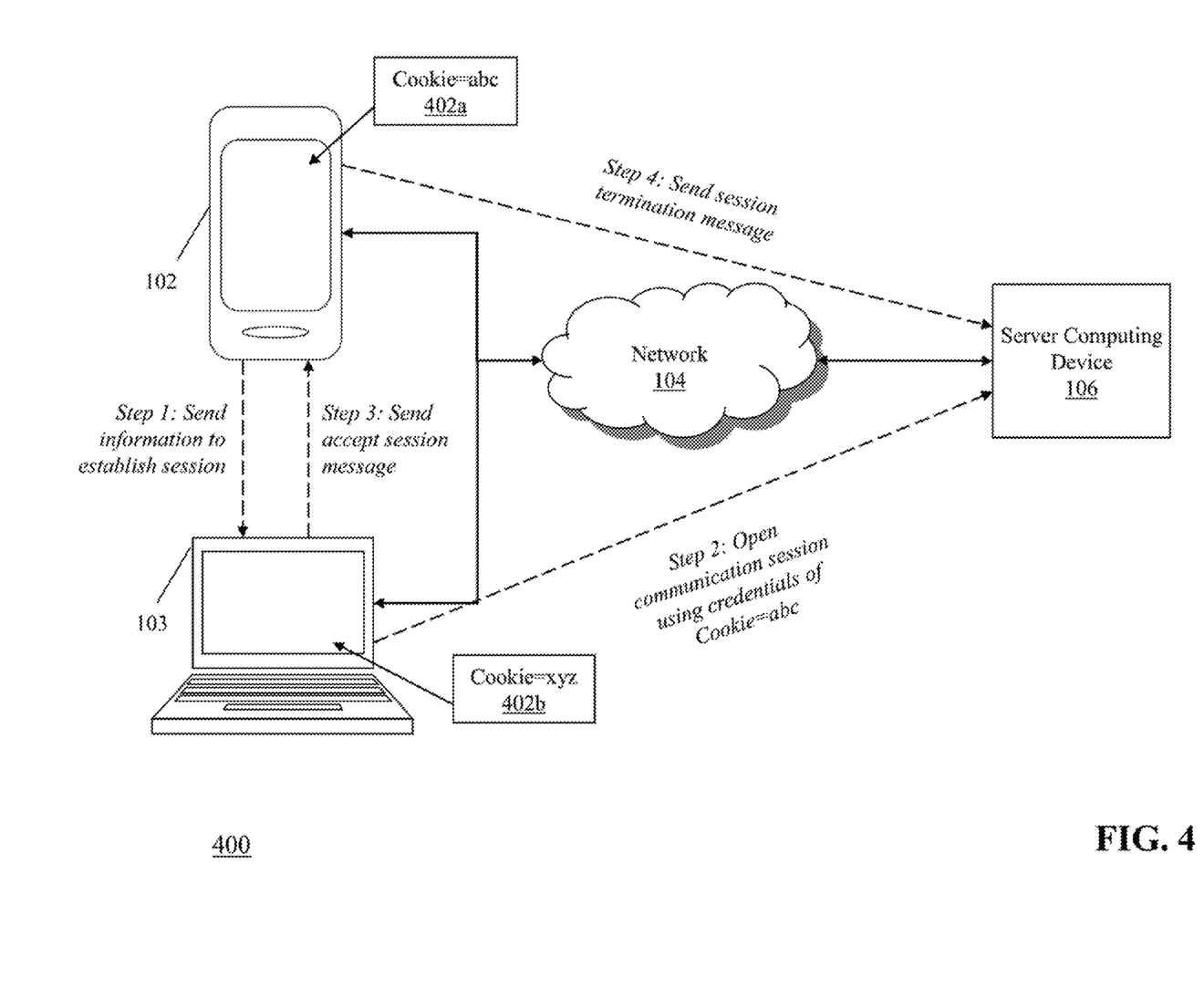
FIG. 4 is a workflow diagram of a method for communication session transfer between a plurality of computing devices.

FIG. 4 is a workflow diagram of a method 400 for communication session transfer between a plurality of computing devices, using the system 100 of FIG. 1. Each client computing device 102, 103 has previously generated a token, as described above with respect to FIG. 3. In addition, the mobile device 102 has previously established a communication session (e.g., HTTP) with the server computing device 106. During creation of the previously-established communication session, the server device 106 provided a cookie (e.g., Cookie=abc 402a) to the mobile device 102 that identifies the session. The user now wishes to transfer the previously-established communication session from the mobile device 102 to the desktop device 103.

Step 1: The user places the mobile device 102 in proximity to the desktop device 103, and the mobile device 102 detects the existence of the desktop device 103 via a wireless protocol (e.g., Bluetooth, NFC, and/or Wi-Fi). The mobile device 102 and the desktop device 103 perform a handshake routine using the token generation and management software to validate the identity of each device and validate that a wireless connection to transfer a session between the devices should be established.

In some embodiments, the handshake routine includes the desktop device 103 sending its token (or portion of a token) to the mobile device 102. The token generation and management software on the mobile device 102 analyzes the token received from the desktop device 103 to validate the identity of the desktop device 103. For example, the software can validate the unique identifier of the desktop device 103 and the shared ID as stored in the token. In the case where the token is encrypted, the mobile device 102 can decrypt the token prior to analysis. In some embodiments, the mobile device 102 maintains a trusted list of devices with which it can establish wireless connections and transfer communication sessions. The mobile device 102 can compare the unique identifier in the received token against the trusted list to validate the identity of the desktop device 103. If the received token cannot be validated, the mobile device 102 can refuse to connect with the desktop device 103. In some embodiments, the handshake route occurs in the reverse fashion, where the desktop device 103 analyzes and validates a token received from the mobile device 102. Once the software on the mobile device 102 has validated the received token, the handshake routine includes the mobile device 102 sending the credentials associated with Cookie=abc 402a to the desktop device 103.

In some embodiments, in validating the desktop device 103, the mobile device 102 determines whether the desktop device 103 is located on the same local network (e.g., a Wi-Fi LAN) as the mobile device 102. For example, the mobile device 102 and the desktop device 103 can both be connected to the user's personal LAN at his home. The personal LAN may have certain security settings that the devices 102, 103 share and that can be validated. If the desktop device 103 is located on the same local network, then the mobile device 102 establishes the wireless connection to the desktop device. If the desktop device 103 is not located on the same local network, then the mobile device 102 refuses to establish the wireless connection.

Step 2: Using the Cookie=abc 402a credentials, the desktop device 103 connects to the server device 106 and establishes a new communication session with the server device 106. Upon establishing the new session, the server device 106 returns another cookie (e.g., Cookie=xyz 402b) that identifies the new session. Because the session was initiated by the desktop device 103 using the credentials of Cookie=abc 402a, the credentials of Cookie=xyz 402b returned by the server 106 match the Cookie=abc 402a credentials. As a result, the new session retains the attributes and state of the previously-established session.

Step 3: The desktop device 103, using the token generation and management software, sends an accept session transfer message to the mobile device 102. The accept session transfer message informs the mobile device 102 that the desktop device 103 has successfully established a session with the server device 106.

Step 4: Using the previously-established communication session (which remains active), the mobile device 102 sends a session termination message to the server device 106. The session termination message includes an instruction to destroy the Cookie=abc 402*a* and end the communication session between the mobile device 102 and the server device 106.

In some embodiments, the mobile device 102 does not send the session transmission message to the server device 106. The previously-established communication session between the mobile device 102 and the server device 106 remains active for additional interaction by the user.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for communication session transfer between a plurality of computing devices, the method comprising:
    detecting, by a first computing device, a presence of a second computing device in proximity to the first computing device, wherein the first computing device has established a first communication session with a remote computing device;
    establishing, by the first computing device, a wireless connection to the second computing device;
    transmitting, by the first computing device, a first token generated by the first computing device to the second computing device, wherein the first token includes a pre-stored shared key and an identifier associated with the first computing device and the first token is configured to render the first token invalid if copied for use as an identifier for another device;
    receiving, by the first computing device, a second token generated by the second computing device from the second computing device, wherein the second token includes the pre-stored shared key and an identifier associated with the second computing device and the second token is configured to render the second token invalid if copied for use as an identifier for another device;
    authenticating, by the first computing device, the second token via comparison to the first token; and
    transmitting, by the first computing device to the second computing device, information indicating a state of the first communication session to enable the second computing device to establish a second communication session with the remote computing device, wherein the second communication session is established using the state of the first communication session.

2. The method of claim 1, wherein the first communication session is at least one of: an HTTP-based session, an HTTPS-based session, or a TCP-based session.

3. The method of claim 1, wherein detecting the presence of a second computing device includes monitoring an area around the first computing device for the presence of the second computing device.

4. The method of claim 1, wherein the first token is generated by a security module of the first computing device, and the second token is generated by a security module of the second computing device.

5. The method of claim 1, further comprising:
    determining, by the first computing device, whether the identifier of the second computing device is on a trusted list stored at the first computing device;
    establishing, by the first computing device, the wireless connection if the identifier of the second computing device is on the trusted list; and
    refusing, by the first computing device, the wireless connection if the identifier of the second computing device is not on the trusted list.

6. The method of claim 1, further comprising:
    determining, by the first computing device, whether the second computing device is connected to a same local network as the first computing device;
    establishing, by the first computing device, the wireless connection if the second computing device is connected to the same local network; and
    refusing, by the first computing device, the wireless connection if the second computing device is not connected to the same local network.

7. The method of claim 1, wherein the wireless connection includes at least one of: a Bluetooth connection, a near-field communication (NFC) connection, or a Wi-Fi connection.

8. The method of claim 1, further comprising:
    transmitting, by the first computing device to the second computing device, a request to terminate the first communication session; and
    terminating, by the second computing device, the first communication session.

9. The method of claim 8, wherein terminating the first communication session includes destroying a cookie associated with the first communication session, transmitting a session termination request to the remote computing device, or both.

10. The method of claim 9, further comprising transmitting, by the first computing device to the remote computing device, a request to terminate the first communication session.

11. The method of claim 1, wherein establishing a second communication session with the remote computing device includes launching, by the first computing device, an application to establish the second communication session.

12. The method of claim 11, wherein the launched application includes a web browsing application.

13. The method of claim 1, wherein the second communication session is established with one or more same security settings as the first communication session.

14. A system for communication session transfer between a plurality of computing devices, the system comprising:
    a first computing device;
    a second computing device; and
    a remote computing device;
    the first computing device configured to
        detect a presence of a second computing device in proximity to the first computing device, wherein the first computing device has established a first communication session with the remote computing device,
        establish a wireless connection to the second computing device,
        transmit a first token generated by the first computing device to the second computing device, wherein the first token includes a pre-stored shared key and an identifier associated with the first computing device and the first token is configured to render the first token invalid if copied for use as an identifier for another device, receive a second token generated by the second computing device from the second computing device, wherein the second token includes the pre-stored shared key and an identifier associated with the second computing device and the second token is configured to render the second token invalid if copied for use as an identifier for another device, authenticate the second token via comparison to the first token, and transmit information to the second computing device indicating a state of the first communication session to enable the second computing device to establish a second communication session with the remote computing device, wherein the second communication session is established using the state of the first communication session.

15. The system of claim 14, wherein the first communication session is at least one of: an HTTP-based session, an HTTPS-based session, or a TCP-based session.

16. The system of claim 14, wherein detecting the presence of a second computing device includes monitoring an area around the first computing device for the presence of the second computing device.

17. The system of claim 14, wherein the first token is generated by a security module of the first computing device, and the second token is generated by a security module of the second computing device.

18. The system of claim 14, wherein the first computing device is further configured to:

determine whether the identifier of the second computing device is on a trusted list stored at the first computing device;

establish the wireless connection if the identifier of the second computing device is on the trusted list; and refuse the wireless connection if the identifier of the second computing device is not on the trusted list.

19. The system of claim 14, wherein the first computing device is further configured to:

determine whether the second computing device is connected to a same local network as the first computing device;

establish the wireless connection if the second computing device is connected to the same local network; and refuse the wireless connection if the second computing device is not connected to the same local network.

20. The system of claim 14, wherein the wireless connection includes at least one of: a Bluetooth connection, a near-field communication (NFC) connection, or a Wi-Fi connection.

21. The system of claim 14, wherein the first computing device is further configured to transmit, to the remote computing device, a request to terminate the first communication session to enable the second computing device to terminate the first communication session.

22. The system of claim 21, wherein terminating the first communication session includes destroying a cookie associated with the first communication session, transmitting a session termination request to the remote computing device, or both.

23. The system of claim 22, wherein the first computing device is further configured to transmit a request to terminate the first communication session to the remote computing device.

24. The system of claim 14, wherein establishing a second communication session with the remote computing device includes launching an application to establish the second communication session.

25. The system of claim 24, wherein the launched application includes a web browsing application.

26. The system of claim 14, wherein the second communication session is established with one or more same security settings as the first communication session.

27. A computer program product, tangibly embodied in a non-transitory computer-readable storage medium, for communication session transfer between a plurality of computing devices, the computer program product including instructions operable to cause a first computing device to:

detect a presence of a second computing device in proximity to the first computing device, wherein the first computing device has established a first communication session with a remote computing device;

establish a wireless connection to the second computing device;

transmit a first token generated by the first computing device to the second computing device, wherein the first token includes a pre-stored shared key and an identifier associated with the first computing device and the first token is configured to render the first token invalid if copied for use as an identifier for another device;

receive a second token from the second computing device, wherein the second token includes the pre-stored shared key and an identifier associated with the second computing device and the second token is configured to render the second token invalid if copied for use as an identifier for another device;

authenticate the second token via comparison to the first token; and transmit information to the second computing device indicating a state of the first communication session to enable the second computing device to establish a second communication session with the remote computing device, wherein the second communication session is established using the state of the first communication session.

* * * * *